United States Patent [19]

Shar et al.

[11] Patent Number: 4,740,911
[45] Date of Patent: Apr. 26, 1988

[54] DYNAMICALLY CONTROLLED INTERLEAVING

[75] Inventors: Len Shar, Palo Alto; Harold L. McFarland, Santa Clara, both of Calif.

[73] Assignee: ELXSI International, San Jose, Calif.

[21] Appl. No.: 850,089

[22] Filed: Apr. 9, 1986

Related U.S. Application Data

[63] Continuation of Ser. No. 660,545, Oct. 12, 1984, abandoned, which is a continuation of Ser. No. 329,627, Dec. 11, 1981, abandoned.

[51] Int. Cl.[4] .............................................. G06F 12/02
[52] U.S. Cl. ...................................................... 364/900
[58] Field of Search ... 364/200 MS File, 900 MS File

[56] References Cited

U.S. PATENT DOCUMENTS

| | | | |
|---|---|---|---|
| 3,657,705 | 4/1972 | Mekota, Jr. et al. | 364/200 |
| 3,943,494 | 3/1976 | Holmes, Jr. et al. | 364/200 |
| 4,001,790 | 1/1977 | Barlow | 364/200 |
| 4,093,983 | 6/1978 | Masog et al. | 364/200 |
| 4,124,893 | 11/1978 | Joyce et al. | 364/200 |
| 4,254,463 | 3/1981 | Busby et al. | 364/200 |
| 4,280,176 | 7/1981 | Tan | 364/200 |
| 4,366,539 | 12/1982 | Johnson et al. | 364/200 |

OTHER PUBLICATIONS

Matick, Richard E.; "Computer Storage Systems and Technology"; John Wiley and Sons, 1977; pp. 339–341.

Primary Examiner—Gary V. Harkcom
Assistant Examiner—David L. Clark
Attorney, Agent, or Firm—Townsend & Townsend

[57] ABSTRACT

A data processing system in which interleaving among memory controllers may be controlled. The interleaving is carried out on a double-word basis, and the state of the double-word address bit is used to select the bus address of the memory controller in which double-words having that address bit are stored. The dynamically controllable interleaving allows greater flexibility in the design of the memory controllers in a data processing system.

16 Claims, 4 Drawing Sheets

EVEN-BUS ADDRESS EVEN
ODD-BUS ADDRESS ODD
PHYSICAL PAGE ADDRESS-ADDRESS OF THE PAGE WITHIN THE CONTROLLER
Q OFF-QUAD-WORD (256 BIT) ADDRESS WITHIN THE PAGE
D-DOUBLE-WORD (128 BIT) SELECTION WITHIN THE QUAD-WORD
W-WORD (64 BIT) SELECTION WITHIN THE DOUBLE-WORD
B OFF-BYTE (8 BIT) OFFSET WITHIN THAT WORD

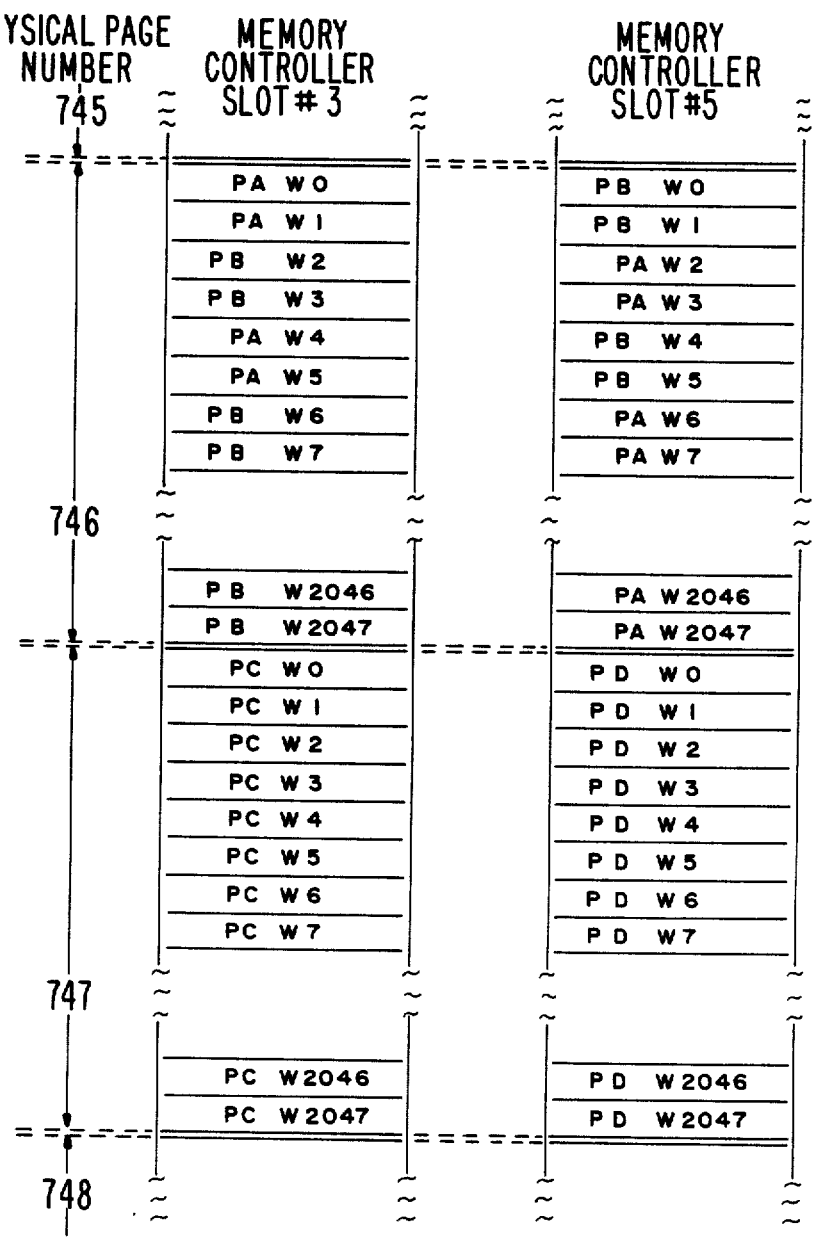

4.6 μs CPU TIME 2.4 μs CPU TIME 1.6 μs CPU TIME

DYNAMICALLY CONTROLLED INTERLEAVING

This is a continuation of application Ser. No. 660,545, filed Oct. 12, 1984, now abandoned, which is a continuation of application Ser. No. 329,627, filed Dec. 11, 1981, now abandoned.

BACKGROUND OF THE INVENTION

1. Field of the Invention

This invention relates to data processing systems, and in particular to a data processing system using controllable interleaving of information stored in different attached memory units.

2. Description of the Prior Art

Interleaving of information stored in different memories in a data processing system is known. In data processing systems with more than one memory the speed of the overall system operation may be increased by placing sequential memory addresses in different memory units. In this manner the total time taken to access a sequence of memory locations may be reduced because several memory accesses may be overlapped by a central processing unit operating at a speed greater than the speed of the individual memories. FIGS. 10a to 10c (from *Encyclopedia of Computer Science*, A. Ralston, editor, Petrocelli Charter 1976) provide an example. In FIG. 10, it is assumed that 0.6 microseconds are required to take a word from memory to the central processing unit, that 1.2 microseconds are required after the initiation of an access to a given memory before the memory unit may again be accessed, that the central processing unit requires 0.2 microseconds to prepare a memory request and 0.2 microseconds to handle the response in the desired manner.

As illustrated in FIG. 10a, without interleaving a sequence of four memory accesses would require 4.6 microseconds. The CPU first prepares request A which consumes 0.2 microseconds, then memory M is accessed for information A and the CPU handles the results, for a total of 1 microsecond. Request B may then be prepared, but it cannot be supplied to memory M until 1.2 microseconds have elapsed, at which time memory M may be reaccessed. In a similar manner, requests C and D are prepared and responses received.

FIG. 10b shows that the effect of two-way interleaving is to substantially reduce the overall time for four memory accesses and responses. As shown in FIG. 10b, requests A and B are prepared by the CPU, but because requests A and C are made to one memory while requests B and D to another memory, the total time is shortened to 2.4 microseconds.

FIG. 10c illustrates the effect of four-way interleaving to further reduce total access response time. As shown in FIG. 10c, the four requests A through D are prepared, supplied to separate memories, then returned to the CPU in a total of 1.6 microseconds. FIG. 10c also illustrates that the central processing unit is fully occupied given the assumed operating speeds above. Thus for the system depicted, further interleaving beyond four ways will not increase the overall system speed because the overall system speed is now CPU limited rather than memory limited.

Interleaving and its effect on overall system speed has been the subject of many technical articles. See, for example, *Introduction to Computer Architecture* by H. S. Stone, Science Research Associates, Inc., pages 201 et seq.; and *Design of a Computer, The Control Data 6600* by J. E. Thornton, Scott, Foresman & Co., pages 44 et seq.

The typical prior art technique for accomplishing interleaving relies upon the use of switches or hardware translators. In a prior art system, the last N bits of the address of a given word provide interleaving among $2^N$ modules. Such systems are typically lacking in flexibility because fixed determinations must be made during implementation of the system as to what information will be interleaved and the module in which it will be placed. Such systems use switches or other preset devices to control the interleaving and require memories which are all the same size and have the same addresses. If one or more memory modules is made larger or smaller than other memory modules, the switches controlling the interleaving must be manually reset.

SUMMARY OF THE INVENTION

A data processing system typically includes one or more processing units and several memory controllers connected to the processing units by a bus or other techniques. As the processing units execute stored programs, information is transferred back and forth among the memory controllers and the processing units. To allow more rapid access by the processing unit or other connected functional units to the individual memory units associated with each memory controller, the information stored in the memory controllers may be interleaved.

In one embodiment of this invention the memory controllers are interleaved by specifying two different controller addresses, one for the memory controller which contains even double-word addresses and the other for the controller which contains odd double-word addresses. In other embodiments of the invention the memory controllers may be interleaved on a different basis, e.g. based on single words, quad-words, pages, etc. In the preferred embodiments, a data processing system fabricated according to this invention and including a plurality of addressable memory controllers comprises an address generating means for generating an address for a word of information, which address includes a pair of controller addresses, a page address, and a unit address including a "D" bit; address register means for storing the address; selection means responsive to the state of the "D" bit in the address register means for selecting one of the pair of controller addresses; and means for transmitting the page address and unit address to the memory controller identified by the selected one of the pair of controller addresses. Typically the unit addressed by the unit address is a word in memory. unit upon the entire system. The invention is further advantageous because it allows memory controllers having different numbers and sizes of memory units to be used at the same time without changing mechanical switches or rewiring individual memory controllers or memory units. The invention also permits the simultaneous use of information which cannot be interleaved with information which is interleaved.

BRIEF DESCRIPTION OF THE DRAWINGS

FIG. 5 is a diagram illustrating the grand physical address of a word in a page of memory interleaved between the same two controllers as shown in FIG. 4.

FIG. 6 is a diagram illustrating the grand physical address of a word in a page of information not interleaved and stored entirely within a single memory controller.

FIG. 7 is a diagram illustrating the grand physical address of a word in another page of memory stored in a different memory controller than that shown in FIG. 6.

FIG. 8 illustrates how the pages addressed in FIGS. 4 through 7 will be stored in the individual memory controllers.

DESCRIPTION OF THE PREFERRED EMBODIMENT

Figure 1:
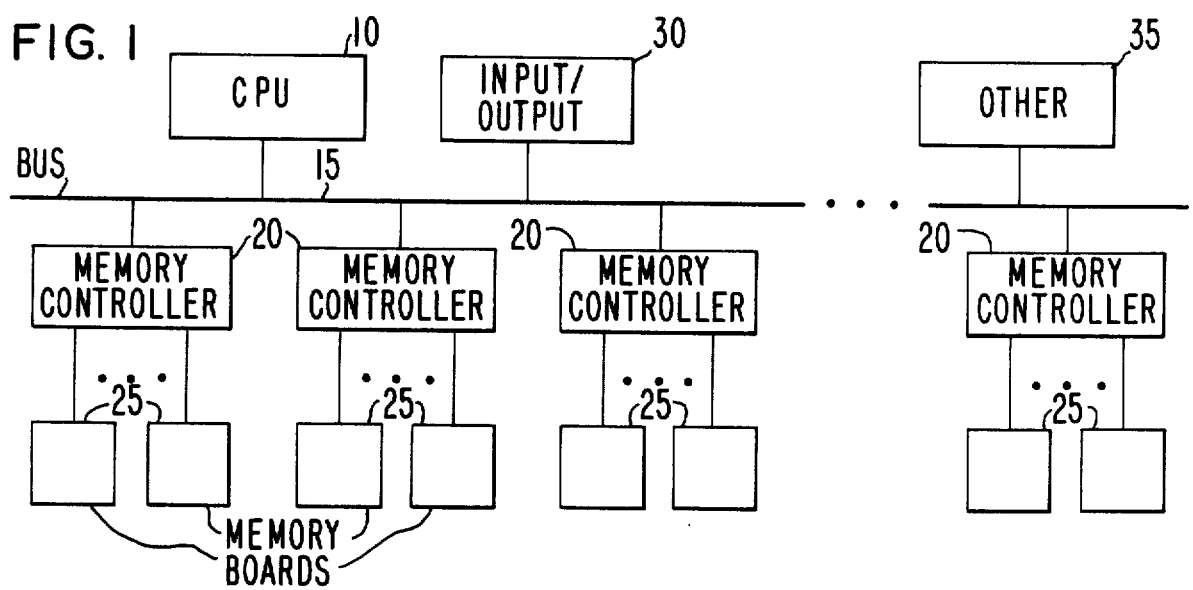
FIG. 1 is a block diagram of a computer system having a plurality of memory controllers.

FIG. 1 is a block diagram of a computer system including a central processing unit 10, a bus 15, and a plurality of memory controllers 20. The term memory controllers herein is intended to refer to any type of apparatus functioning as a controller of the memory arrays in a data processing system. Memory controllers such as controllers 20 depicted in FIG. 1 are well known in the data processing arts. See, for example, *VAX Hardware Handbook,* Digital Equipment Corp. 1980, pp. 147-151. Associated with each memory controller 20 is a plurality of memory arrays 25 each containing a plurality of integrated circuit memory devices typically mounted on a printed circuit board. The number of memory arrays 25 associated with each memory controller 20 may vary. In a preferred embodiment of the apparatus shown in FIG. 1, there are two or more memory controllers, each controller having associated therewith two independent memory arrays, each array capable of storing 8 megabytes of information.

The function of a memory controller 20 is to manage the memory arrays 25 attached to it. Each memory controller 20 functions to keep track of the pages of information, typically 256 words, which have been addressed and/or written into the memory. The memory controller will perform a variety of other functions such as maintaining a record of which memory units are functional and which are not. Error detection and correction may also be performed by the memory controller, together with other diagnostic facilities. Also attached to bus 15 may be well-known input/output devices 30 such as magnetic tape readers or printers or other equipment 35, for example, a service processor for diagnosing and repairing other units connected to bus 15.

As in conventional data processing systems, it is necessary for each word stored in any of the memory boards 25 to be individually accessible to the central processing unit 10, the input/output devices 30, or other equipment 35 connected to bus 15. As such, each word must have an address by which it is retrievable. In the preferred embodiment, the address of a word in any of the memory boards 25 includes all the information needed for any piece of equipment connected to the bus to access that word. This address is termed herein the physical address.

Figure 2:
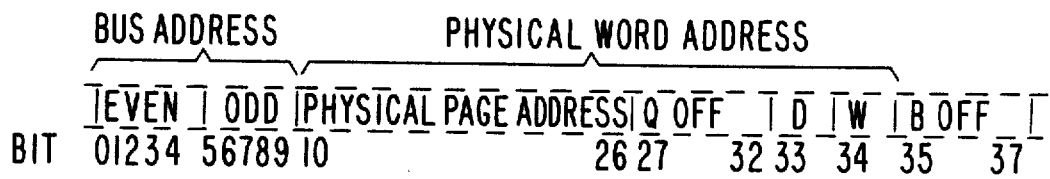
FIG. 2 is a diagram showing a grand physical address in a data processing system using dynamically controllable interleaving.

The information stored in the memory arrays is divided into pages, each of which comprises 256 words of 64 bits. Because each page may be interleaved between two controllers, a general specification of address applicable to any word within a page must include specification of the memory controller(s) which contain the page. This is termed the grand physical address, and a diagram of the grand physical address appears in FIG. 2. FIG. 2 shows that to access a given word, the grand physical address must include a physical page address which is the address of the 256 words within which the desired word resides. The page address is provided by bits number 10 through 26 as shown in FIG. 2. Once the proper page has been specified, a quadword offset within that page must be specified to define the sequential group of four words within which the desired word resides. This quad-word address is specified using bits 27 through 32. The double-word address within the quad-word is specified by bit 33, while the word selection within the double-word is provided by bit number 34. If only an 8-bit byte within the word is sought, a byte offset within the word may be specified by bits 35 through 37. In addition to the physical word address provided by bits 10 through 34, the grand physical address includes ten bits to specify the address of the slot on bus 15 at which the desired memory controller is connected. It is through these bits, designated 0 to 9, together with the "D" bit, that the dynamically controllable interleaving of this invention is accomplished in the preferred embodiment. In other embodiments where other or more than the "D" bit is used, the bit or bits used are termed the select-field.

In the preferred embodiment, each memory controller 20 is connected to bus 15 by being plugged into a socket to which the bus is connected. Each socket is given an address, which is the address of the device connected thereto. The five "bus address even" bits designated 0 to 4 shown in FIG. 2 provide 32 bus addresses, as do the five "bus address odd" bits designated 5 to 9 in FIG. 2. The term "bus address even" refers to the address of the slot on the bus 15 to which a memory controller is connected in which the double-words of the interleaved page having even numbered double word addresses, i.e. having a D bit of 0, are stored. Similarly, the "bus address odd" is an address of the slot on the bus 15 to which a memory controller storing double-words having odd numbered double word addresses, i.e. having a D bit of 1, is connected. The use of five bits enables the system described to have up to 32 bus connections. If more connections are desired then a larger address may be employed. As used in conjunction with the memory controllers, the terms controller address and bus address mean the same. In conjunction with other functional units connected to the bus, the term bus address is used to denote the fact that units other than memory controllers may be connected to the bus.

As previously explained, to increase the overall throughput of a digital computer system, it is advantageous to interleave access to the memory controllers. In the preferred embodiment of this invention, this interleaving is accomplished by specifying two different bus or memory controller addresses, one for the memory controller 20 which contains the even numbered double-word addresses and the other for the memory controller 20 which contains the odd numbered double-word addresses. We have discovered that this form of interleaving is particularly advantageous because it allows interleaving to be used on some pages and not on others. For example, in a typical digital computer system it may be desirable not to interleave all pages stored in a controller. Further, if an individual integrated circuit memory chip fails, all pages which contain addresses within that integrated circuit cannot be used reliably. As integrated circuit memories increase in size, the number of pages of data lost in a controller due to failure of one of the memory circuits may become large. For example, with a 64,000 bit size integrated circuit memory, a single failure not correctable by error control renders any of the 256 pages (512,000 bytes) which are partially stored in that chip unusable. Using conventional hardware controlled interleaving between memory controllers, corresponding pages on other controllers could not be used, causing either a further loss of an equivalent amount of memory or physically disabling interleaving with consequent performance degradation.

If a page is interleaved between two memory controllers A and B according to this invention, then the single page will actually be divided into two distinct pages, each with the same page number within the controller, but one distinct page will have the bus address even and the bus address odd exchanged with respect to the other distinct page. Furthermore unlike any known prior art apparatus capable of interleaving, the interleaving technique of this invention permits interleaving to use an odd number of controllers. For example, if the three controllers are termed A, B and C, then there may be three distinct interleaved pages, each of which has the same physical page address within each of controllers A, B and C, but one page having bus address even as A and odd as B, the second having even as B and odd as C, and the third having even as C and odd as A.

The grand physical address shown in FIG. 2 is merely a "logical" physical address as far as the particular unit, whether it be CPU 10, input/output apparatus 30 or other units 35 are concerned. The grand physical address is not the address which the particular unit sends on bus 15 to memory controllers 20.

Figure 3:
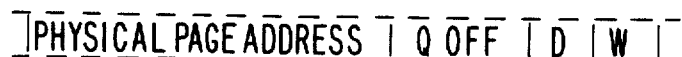
FIG. 3 is a diagram showing the physical word address transferred onto the bus connected to the memory controllers.

The actual word address transmitted on bus 15 is shown schematically in FIG. 3. As shown in FIG. 3, the actual physical address includes a page address portion, quad-word offset portion, and double-word and single-word bits. If the bus address even and bus address odd are the same, then the address refers to an address in a page which is not interleaved. In such an event, the physical word address shown in FIG. 3 is transferred onto bus 15 to the specified module.

On the other hand, if the bus address even and bus address odd bits are different, then the addressed page is interleaved and the physical word address must be sent to one of the two different controllers 20 specified. The controller to which the physical word address is transferred will depend upon the state of the "D" bit. If the "D" bit is 0, then the physical word address is sent to bus address even. If the "D" bit is 1, then the physical word address is transmitted to the bus address odd memory controller. Because a page which is not interleaved has the same bus address even and odd, it is unnecessary for any of the units 10, 30 or 35 in addressing any word of memory to determine, whether by lookup table or other means, if the particular page in which the word is contained is interleaved.

Figure 4:
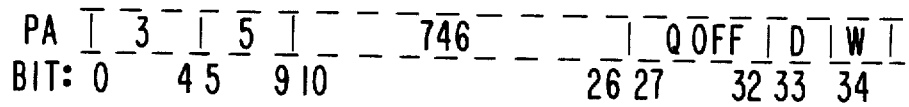
FIG. 4 is a diagram illustrating the grand physical address of a word in a page of memory interleaved between two controllers.

A more detailed example of the controllable interleaving of this invention is presented in FIGS. 4 through 9. For example, assume that there are two memory controllers, one at bus address 3 and the other at bus address 5. A page designated PA which is interleaved between memory controllers 3 and 5 and which is stored half at each physical page address 746 within those controllers will have an address as shown in FIG. 4. The state of the "D" bit for a given double-word will indicate in which controller that double word is stored.

A page designated PB which is interleaved between the same two controllers, and which has the same physical page address 746, will have a grand physical address as shown in FIG. 5. Note that in FIG. 4 bus address even is 3 and bus address odd is 5, while in FIG. 5 the bus address and bus address odd are interchanged.

FIG. 6 shows the grand physical address of a page designated PC which is not interleaved and which is stored entirely within memory controller 5 at page number 747. Both bus address even and bus address odd are "5". FIG. 7 shows the grand physical address of a page designated PD which is not interleaved and is stored entirely within memory controller 3 at physical page number 747. Both bus address even and bus address odd are "3". In each case the state of the "D" bit does not determine in which controller a double word is stored.

FIG. 8 is a diagram showing how the pages PA, PB, PC and PD having addresses as shown in FIGS. 4 through 7 would be stored in the memory controllers at slots 3 and 5. Each entry in FIG. 8 represents an 8 byte word in the particular controller. As shown by FIG. 8, word addresses 2, 3; 6, 7 . . . 2046, 2047 of page PA are found in memory controller 5, while words 0, 1; 4, 5 . . . of page PA are found in memory controller 3. The words of PA in memory controller 5 are present because D=1 which places the second double-word of each quad-word in memory controller 5. All of pages PA and PB are found under physical page number 746. Page PB, which has been interleaved with page PA in memory controllers 3 and 5, carries a page address 746 but words in PB in controller 5 will have D=0.

Pages PC and PD have not been interleaved as indicated by the physical addresses shown in FIGS. 6 and 7. Accordingly, all of page PC is found in memory controller 3 under page address 747, while all of page PD is found in memory controller 5 under page address 747. The state of the D bit will not determine the controller because bus addresses even and odd are the same.

Although not shown in the figures, each individual memory controller may be further interleaved internally on the basis of the state of the "W" bit, or both words of the double word may be fetched simultaneously for sequential transmission. In this manner adjacent words on a page may actually reside in different integrated circuit memories which may be separately cycled. For example, words PA W 2 and PA W 3 may be stored in separately cyclable RAM's based upon the status of the "W" bit. In this manner access to the first four words, or any four adjacent words, in any page may be completely overlapped, that is, page PA is actually interleaved four ways.

Figure 9:
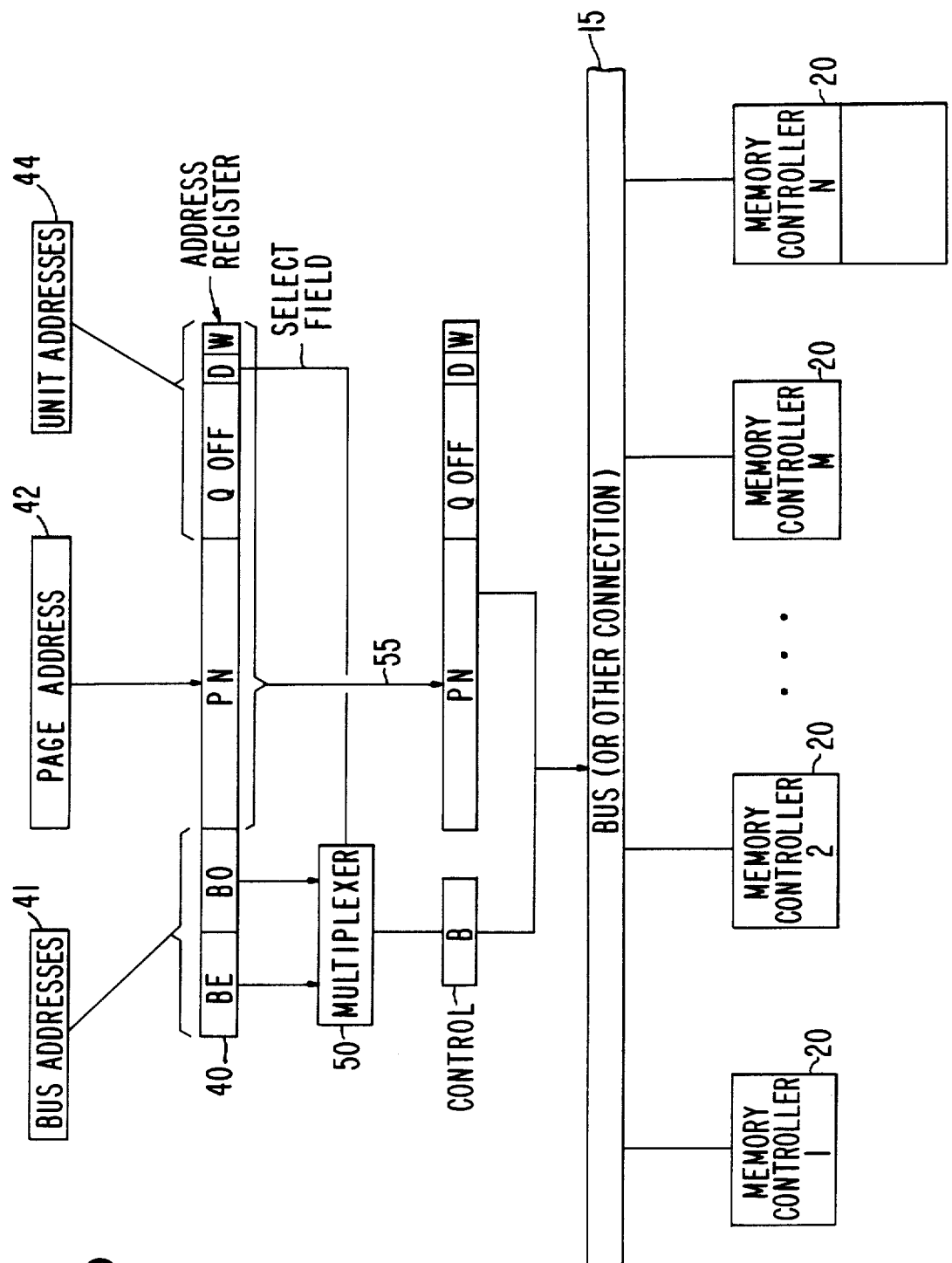
FIG. 9 is a block diagram illustrating the dynamically controllable interleaving among a group of memory controllers.
Figure 10A:
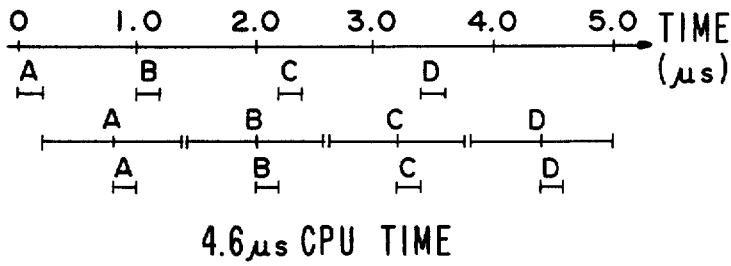
FIGS. 10a, 10b and 10c, illustrate the prior art concepts of interleaving.
Figure 10B:
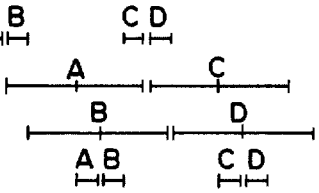
Figure 10C:
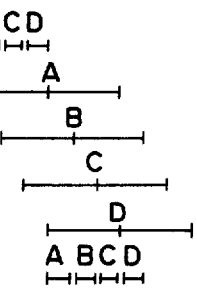

FIG. 9 is a schematic diagram illustrating an apparatus for implementing the controllable interleaving discussed above. In the same manner as discussed in conjunction with FIG. 1, the structure shown in FIG. 9 includes a bus 15 and a plurality of memory controllers 20 which need not be the same size. The structure shown in FIG. 9 also includes an address register 40 and a multiplexer 50 typically situated in a processing unit connected to bus 15. Address register 40 may be implemented in any known fashion, but typically will comprise a register coupled between a functional unit and bus 15. Using known technology, the functional unit associated with address register 40 will introduce into address register 40 bus or controller addresses 41, a page address 42, and a unit address 44. The bus or controller address 41 and the page address 42 will originate from a page map. This entry in the page map was taken from a page frame table describing physical memory and which was created by a service processor or other mechanism when the system was initialized. The functional unit introducing the addresses will calculate the word address (or byte address if necessary).

Once the address register 40 is loaded with the desired address information, the location of a desired word in memory is placed on bus 15 by a multiplexer 50. Multiplexer 50 receives as inputs the five bit bus addresses, both even and odd, and the single "D" bit. In the manner previously explained, the state of the "D" bit will cause one of the bus address even or bus address odd addresses to be placed on bus 15 via the control part of address path 55. Multiplexer 50 may be of any well-known design which places one of two five-bit inputs onto a bus in response to the state of a single bit. At the same time, the page number, quad-word offset, double-word bit and single-word bit are placed on the bus 15 via address path 55. The selected bus address even or bus address odd acts as an address for an individual memory controller, while the remainder of the information comprising the page number, quad-word offset, double-word and single-word bits is accepted by the memory controller as a word address. Thus, the particular word sought to be retrieved or written is addressed.

Although the foregoing is intended to discuss a preferred embodiment of the invention, it will be apparent to those skilled in the art that numerous variations may be made without departing from the scope of the invention as defined in the appended claims. For example, if interleaving is desired on other than a double-word basis, or if more than two way dynamically controlled interleaving is desired such may be readily achieved by using the appropriate bit or bits rather than the "D" bit discussed above. Similarly, although the preferred embodiment has discussed interleaving primarily in conjunction with a bus, such is not essential. For example, the memory controllers may be connected to the processors by ports, grids, crossbar switches or otherwise.

What is claimed is:

1. A data processing system for interleaving units of information among an arbitrary group of memory controllers, the system comprising:

a plurality of memory controllers each connected to corresponding storage apparatus for storing information therein;

address generating means for generating an address indicative of the storage apparatus in which the units of information are to be stored, which address includes a page address, a unit address, a select field and a plurality of memory controller address fields, each memory controller address field containing a memory controller address for one of the memory controllers of the arbitrary group;

address register means coupled to the address generating means for storing the address generated thereby;

selection means coupled to the address register means and responsive to the state of the select field in the address for selecting the memory controller address of only one of the memory controllers from the arbitrary group of memory controllers by selecting only one of the plurality of memory controller address fields, and by selecting different memory controller address fields for units of information having the same page address and consecutive unit addresses; and communication means coupled to the selection means and to the address register means for transmitting the page address and the unit address to the memory controller having the address selected by the selection means.

2. A system as in claim 1 wherein the communication means for transmitting comprises a bus.

3. A system as in claim 1 wherein the plurality of controller addresses comprise $2^N$ addresses where N is a posititve integer.

4. A system as in claim 3 wherein the select-field comprises N bits.

5. A system as in claim 4 where the N=1.

6. A system as in claim 4 wherein the select field comprises the N low-order bits of the unit address.

7. A system as in claim 1 wherein the address generating means comprises a data processing unit.

8. A system as in claim 7 wherein the unit address comprises a word address.

9. A system as in claim 7 wherein the address register means comprises a register for storing a plurality of bits.

10. A system as in claim 1 wherein the selection means comprises a multiplexer.

11. A system as in claim 1 wherein the address generated by the address generating means further includes a sub-unit address.

12. A system as in claim 11 wherein the unit address comprises a double-word address and the sub-unit address comprises a word address.

13. A system as in claim 2 wherein each of the addressable memory controllers and the address generating means are connected to the bus.

14. A data processing system as in claim 1 wherein portions of the unit of information are stored in apparatus associated with more than two memory controllers.

15. A system as in claim 1 wherein the unit address includes a "D" bit.

16. A system as in claim 15 wherein the selection means comprises multiplexer means responsive to the state of the "D" bit.

* * * * *